United States Patent [19]

Shikama et al.

[11] Patent Number: 4,782,259

[45] Date of Patent: Nov. 1, 1988

[54] FREQUENCY GENERATOR AND MOTOR WITH THE SAME

[75] Inventors: Shuuichi Shikama; Kinji Kawashima; Toshiharu Yagi, all of Saitama, Japan

[73] Assignees: Sanyo Electric Co., Ltd., Japan; Kumagaya Seimitsu Co., Ltd., Japan

[21] Appl. No.: 791,779

[22] Filed: Oct. 28, 1985

[30] Foreign Application Priority Data

| Nov. 1, 1984 [JP] | Japan | 59-230564 |
| Nov. 1, 1984 [JP] | Japan | 59-230565 |
| Nov. 1, 1984 [JP] | Japan | 59-230566 |
| Nov. 1, 1984 [JP] | Japan | 59-230567 |

[51] Int. Cl.⁴ ............................ H02K 21/12
[52] U.S. Cl. ................... 310/156; 310/67 R; 310/68 R; 310/113; 310/180; 310/268; 310/269
[58] Field of Search ............ 310/156, 68 R, 171, 310/180, 113, 184, 268, 208, 269, 216, 67 R, 254, 159, 160, 161; 322/30, 31; 318/327, 464, 254

[56] References Cited

U.S. PATENT DOCUMENTS

| 3,264,539 | 8/1966 | Sander | 318/327 |
| 3,940,645 | 2/1976 | Takita | 310/156 |
| 4,093,897 | 6/1978 | Fujita | 310/268 |
| 4,097,754 | 6/1978 | Farr | 310/67 R |
| 4,280,072 | 7/1981 | Gotow | 310/67 R |
| 4,302,692 | 11/1981 | Matsumoto | 310/113 |
| 4,418,296 | 11/1983 | Ebenthever | 310/67 R |
| 4,481,440 | 11/1984 | Muller | 310/268 |
| 4,583,015 | 4/1986 | Toshimitsu | 310/269 |

FOREIGN PATENT DOCUMENTS

| 1937827 | 4/1971 | Fed. Rep. of Germany | 310/171 |
| 2053262 | 5/1972 | Fed. Rep. of Germany | 310/156 X |
| 2634951 | 2/1978 | Fed. Rep. of Germany | 310/171 |

*Primary Examiner*—R. Skudy
*Attorney, Agent, or Firm*—Darby & Darby

[57] ABSTRACT

A frequency generator comprises a cylindrical rotor to which an annular multipolar magnet is fixed on the inner wall thereof. The multipolar magnet includes a plurality of magnetizable sectors arranged in a circumferential direction thereof, and adjacent magnetizable sectors are magnetized alternately in reverse polarity. Within the rotor, two disk-shaped magnetic plates are supported fixedly with a predetermined space axially. On the peripheries of respective magnetic plates, a plurality of salient poles are formed with a predetermined pitch in a circumferential direction thereof. The salient poles of each magnetic plate respectively constitute a salient-pole line. Between the two salient-pole lines, a generating coil is wound in a circumferential direction thereof. To each first and second salient poles to be paired, the magnetizable sectors of different polarity of the multipolar magnet are faced in divergence relatively in the circumferential direction. A magnetic flux from the multipolar magnet interlinks with the generating coil by the salient poles to be paired of the two salient-pole lines. Accordingly, in the generating coil, an alternating signal of frequency corresponding to the rotation numbers of the rotor is generated. When constituting a motor, a driving coil is wound on the teeth of the magnetic plate.

12 Claims, 6 Drawing Sheets

FREQUENCY GENERATOR AND MOTOR WITH THE SAME

BACKGROUND OF THE INVENTION

1. Field of the Invention

The present invention relates to a frequency generator and a motor with the same. More specifically, the present invention relates to a frequency generator which generates an alternating signal by interlinking a magnetic flux of a multipolar magnet disposed on a rotor with a generating coil, and a motor utilizing such frequency generator.

2. Description of the Prior Arts

A most outdated frequency generator uses a gear. Such generator using the gear requires many components, thus resulting in complicated constructions as well as in high cost. The frequency generator being able to solve disadvantages is disclosed, for example, in U.S. Pat. No. 3,264,539, issued on Aug. 2, 1966. In the prior U.S. Patent, a motor with frequency generator is disclosed, in which both the driving coil and the generating coil are wound on the teeth of the stator and a multipolar magnet is arranged rotatably so as to face to the generating coil via the radial gap. In such frequency generator, although there is some advantages of simple construction because of the separate components such as gear and so on can be omitted, the following problems still remain to be solved.

In more detail, in the prior U.S. Patent, the driving coil and the generating coil must be wound on the same tooth of the stator, which is awkward and troublesome in assembling. In addition, since two coils are wound on the same tooth of the stator, the space factor is reduced and the number of turns of the driving coil is limited. Thus, if the same size of the stator, only the motor with a small torque can be obtained and the stator size must be enlarged when the larger torque is required.

SUMMARY OF THE INVENTION

It is, therefore, a principal object of the present invention to provide a novel frequency generator and a motor with the same.

It is another object of the present invention to provide a frequency generator where the coiling work of a generating coil is simple.

It is a further object of the present invention to provide a motor with frequency generator where the space factor of a driving coil will not reduce.

The present invention comprises a frequency generator which includes an annular multipolar magnet sustained rotatably by the rotating shaft, having a plurality of magnetizable sectors arranged in a circumferential direction and the adjacent magnetizable sectors being magnetized alternately in the reverse polarity. First and second salient-pole lines being spaced axially and respectively facing to the multipolar magnet are disposed, wherein respective salient-pole lines include a plurality of salient poles arranged circumferentially with a predetermined pitch and made of magnetic materials. Between the first and second salient poles lines, a generating coil is wound circumferentially. To the salient poles to be paired of the first and second salient-pole lines, the different magnetizable sectors of the multipolar magnet are faced in divergence relatively in the circumferential direction.

The magnetic flux from the multipolar magnet interlinks with the generating coil provided between the salient-pole lines, before reaching the salient pole of the second salient-pole line from the salient pole of the first salient-pole line which are to be paired.

According to the present invention, since the generating coil may be just wound circumferentially between the first and second salient-pole lines, such complicated assembling as the U.S. Pat. No. 3,264,539 previously cited can be solved. Even when constituting a motor, since the generating coil and the driving coil are not required to be wound on the same place, the spacing factor is not deteriorated.

In the preferred embodiment of the present invention, $(2n+1)$ pairs of the first and second salient poles are provided for one magnetizable sector of the multipolar magnet. According to the preferred embodiment, when the number of magnetizable sectors of the multipolar magnet is denoted as m, the alternating signal having the frequency of "$m \times \frac{1}{2} \times (2n+1)$" Hz can be obtained from the generating coil.

In an embodiment of the present invention, in order to bring the magnetizable sector of the different polarity of the multipolar magnet to face to the salient poles to be paired of the first and second salient-pole lines, the boundary line of the adjacent magnetizable sectors of the multipolar magnet is substantially inclined to the axial direction, while the first and second salient-pole lines are arranged in such a manner that the axial line of the salient poles to be paired is in parallel to the axial direction. In another embodiment, the boundary line of the adjacent magnetizable sectors of the multipolar magnet are formed in parallel to the axial direction and the axial line of the salient pole to be paired of the first and second salient-pole lines is inclined to the axial direction.

These and other objects, features, aspects and advantages of the present invention will become more apparent from the following detailed description of the embodiment of the present invention when taken in conjunction with accompanying drawings.

DESCRIPTION OF THE PREFERRED EMBODIMENTS

Figure 1:
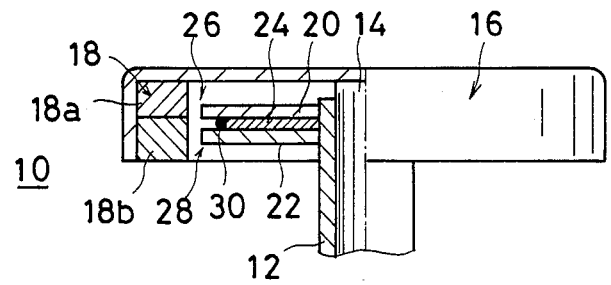
FIG. 1 is an illustrative sectional view showing an example of a frequency generator as one embodiment in accordance with the present invention.

FIG. 1 is a sectional illustrative view showing an example of a frequency generator as one embodiment in accordance with the present invention. A frequency generator 10 includes a rotating shaft 14 sustained rotatably by a bearing 12. On the tip of the rotating shaft 14, a bottom of a cylindrical rotor 16 with bottom is secured at the center thereof. On an inner circumferential wall of the rotor 16, an annular or a disc-shaped multipolar magnet 18 is secured.

In a hollow portion of the rotor 16, disc-shaped magnetic plates 20 and 22 made of a magnetic material, for example, such as a silicon steel plate, are disposed fixedly. The first and second magnetic plates 20 and 22 sandwiching a third magnetic plate 24 are arranged with a predetermined space in an axial direction of the rotating shaft 14. A diameter of the third magnetic plate 24 is determined smaller than that of the first and second magnetic plates 20 and 22.

The first, second and third magnetic plates 20, 22 and 24 may be consisted respectively of one magnetic plate or the laminated thin magnetic plates. Moreover, the first, second and third magnetic plates 20, 22 and 24 may be constituted as a monoblock construction.

Figure 2:
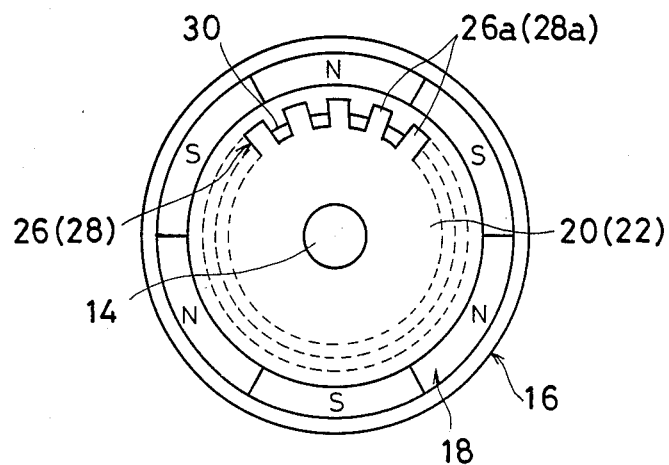
FIG. 2 is an illustrative plane view for explaining a relationship between a multipolar magnet and a salient-pole line in the embodiment of FIG. 1.

On the periphery of the first magnetic plate 20, as shown in FIG. 2, a plurality of salient poles 26a, 26a, . . . are formed with a predetermined pitch circumferentially so as to face to the inner circumference of the multipolar magnet 18. By the plurality of row of salient poles (hereafter referred to as "salient-pole line 26"), 26a, . . . , an annular first salient-pole line 26 is formed. On the periphery of the second magnetic plate 22, similarly, the second salient poles 28a, 28a, . . . facing to the multipolar magnet 18 with the same pitch as the first salient poles 26a, 26a, . . . are formed. By the second row of salient poles (hereafter referred to as "salient-pole line 28"), 28a, . . . , an annular second salient-pole line 28 formed.

Figure 3:
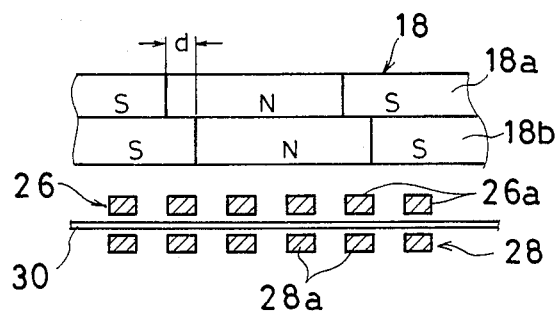
FIG. 3 is an illustrative developed view for explaining a relationship between a multipolar magnet and salient-pole lines.

The salient poles 26a and 28a which are to be paired and constituting the first and second salient-pole lines 26 and 28 are superposed in the axial direction, as shown in FIG. 3. In other words, the first and second salient-pole lines 26 and 28 are arranged so as to bring the axial line of the upper and lower salient poles to be paired linearly in the axial direction.

On the periphery of the third magnetic plate 23, that is, between the first and second salient-pole lines 26 and 28, a generating coil 30 is wound in the circumferential direction. The number of turns of the generating coil 30 is determined in accordance with the required voltage.

The multipolar magnet 18 to which inner circumference the first and second salient-pole lines 26 and 28 are countered includes magnet elements 18a and 18b laminated axially. The magnet elements 18a and 18b include a plurality of magnetizable sectors arranged respectively in the circumferential direction, and the adjacent magnetizable sectors thereof are magnetized alternately in the reverse polarity. Boundary lines of the magnetizable sectors of the magnet elements 18a and 18b are arranged with a divergence of distance d in the circumferential direction as shown in FIG. 3. Thereby, the boundary lines of the adjacent magnetizable sectors of the multipolar magnet 18 are substantially inclined to the axial direction.

In the configuration described above, at a portion of the distance d between the adjacent magnetizable sectors of the multipolar magnet 18, as is apparent from FIG. 3, the salient poles 26a and 28a to be paired of the first and second salient-pole lines 26 and 28, are respectively facing to the magnetizable sector of different polarity. More specifically, at the portion of distance d, the salient pole 26a faces to, for example, the magnetizable sector of the S pole of the magnet element 18a, and the salient pole 28a counters, for example, the magnetizable sector of the N pole of the magnet element 18b. Accordingly, the magnetic flux from the multipolar magnet 18 will reach the separate magnetizable sector (e.g. N pole) of the magnet element 18b (or 18a) from the one magnetizable sector (e.g. S pole) of the magnet element 18a (or 18b) through the first and second salient poles 26a and 28b. Accordingly, the magnetic flux is interlinked with the generating coil 30 between the first and second salient-pole lines 26 and 28 before reaching the second salient pole 28a (or the first salient pole 26a) from the first salient pole 26a (or the second salient pole 28a). Therefore, an alternating signal of the magnitude corresponding to the magnetic flux interlinked therewith is generated in the generating coil 30. The frequency of the alternating signal is proportional to the rotating speed of the rotor 16 or the multipolar magnet 18.

As is apparent from FIG. 3, "(2n+1), where n is integer pairs of the first and second salient poles 26a and 28a provides to face to one magnetizable sector of the multipolar magnet 18, the following advantage may be appreciated.

More specifically, in case where only one pair of the first and second salient poles 26a and 28a to be faced to one magnetizable sector of the multipolar magnet 18, if the multipolar magnet 18 rotates once at every second, the alternating signal of 1Hz can be obtained at the output end of the generating coil 30. However, as the embodiment, if the "2n+1" pairs of salient poles are provided for the one magnetizable sector, the alternating signal of "m×½×(2n+1)" Hz is generated in the generating coil 30 at every rotation of the multipolar magnet 18, when the number of magnetizable sector of the multipolar magnet 18 is denoted as m. Accordingly, when the (2n+1) pairs of first and second salient poles 26a and 28a are countered with one magnetizable sector of the multipolar magnet 18 as such, the alternating signal having the frequency multiplied by m×[(2n+1)/2] may be obtained.

Meanwhile, in the above described embodiment, the first and second salient-pole lines 26 and 28 are integrally formed on the first and second magnetic plates 20 and 22. Therefore, in the above described embodiment, the first and second magnetic plates 20 and 22 are wholly formed by a magnetic material. However, the first and second salient-pole lines 26 and 28 may be formed separately from the first and second magnetic plates 20 and 22. In this case, only the first and second salient-pole lines 26 and 28 need to be made from a magnetic material and it is not necessary to make the first and second magnetic plates 20 and 22 from a magnetic material.

Figure 4:
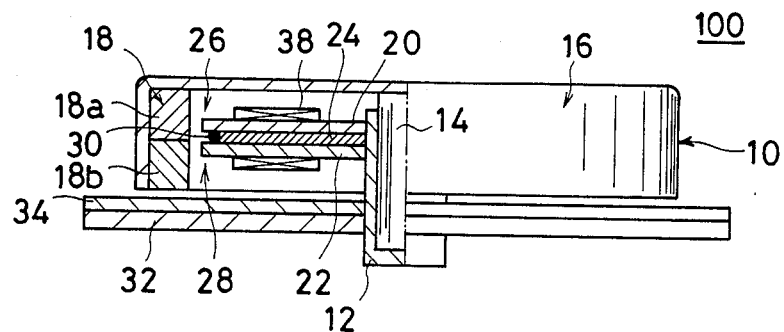
FIG. 4 is an illustrative sectional view showing an example of a motor with frequency generator as another embodiment in accordance with the present invention.

FIG. 4 is an illustrative sectional view showing the embodiment using the frequency generator as previously described in a brushless motor. In the following description, only the portions different from the embodiment of FIG. 1 through FIG. 3, including the driving coils 38, 38, will be described.

The brushless motor 100, including the frequency generator 10', is constituted as an axial gap motor and includes a stator yoke 32 secured on the bearing 12 under the rotor 16. On the stator yoke 32, a circuit board 34 forming a driving circuit (not shown) is provided. As such driving circuit, for example, FIG. 5 of U.S. Pat. No. 4,093,897 may be employed as it is or with the modification thereof. As can be seen in FIG. 4, a frequency generator 10', similar to frequency generator 10 as shown in FIG. 1, but with the modifications described below is disposed above the circuit board 34.

Figure 5:
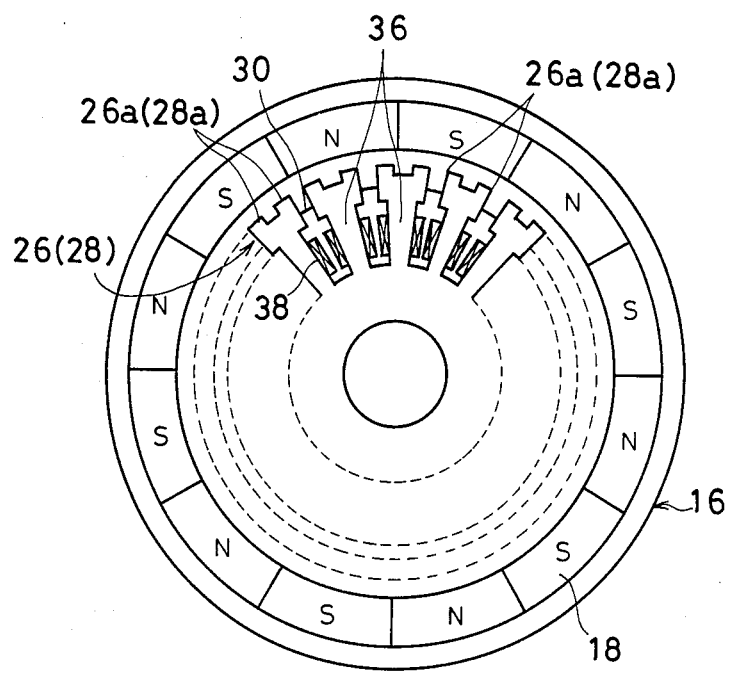
FIG. 5 is an illustrative plane view of the embodiment of FIG. 4.
Figure 6:
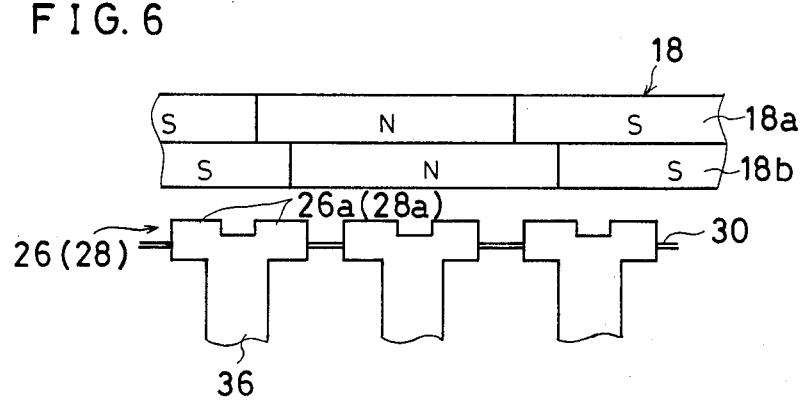
FIG. 6 is an illustrative developed view for explaining a relationship between a multipolar magnet, teeth of a stator and salient poles of the embodiment of FIG. 4.

The frequency generator 10 is modified in that, on the first and second magnetic plates 20 and 22, as shown in FIGS. 4, 5 and 6, a plurality of teeth 36, 36, ... are formed radially, and the first and second salient-pole lines 26 and 28 are formed on tips of teeth 36, 36, ... spaced axially. On the respective teeth 36, 36, ..., driving coils 38, 38, ... are wound.

By supplying the electric current having the reverse polarity to the driving coil 38 wound on the respective teeth 36 alternately through the driving circuit (not shown), the rotor 16 is rotated. As the rotor 16 rotates, as described above, an alternating signal having the frequency corresponding to the rotating speed thereof is obtained from the generating coil 30 of the frequency generator 10.

Figure 7:
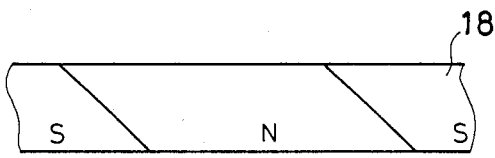
FIGS. 7 and 8 are illustrative views respectively showing a modified example of a multipolar magnet.
Figure 8:
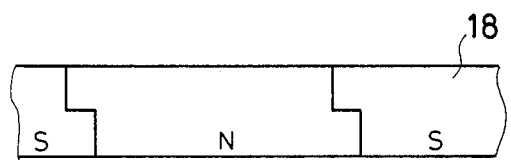

In the embodiments described above, the multipolar magnet 18 is formed by the two laminated magnet elements 18a and 18b, and each magnetizable sector of respective magnet elements 18a and 18b is arranged in divergence by the distance d in the circumferential direction. However, as the multipolar magnet 18, the boundary line of the adjacent magnetizable sectors may be inclined against the axial direction as shown in FIG. 7, by devising the magnetizing method of one magnet element. The multipolar magnet 18 may be also formed by magnetizing in such a way that, in order to form the boundary line substantially in inclination, the boundary line of the one magnet element is diversified in the form of step, as shown in FIG. 8.

Figure 9:
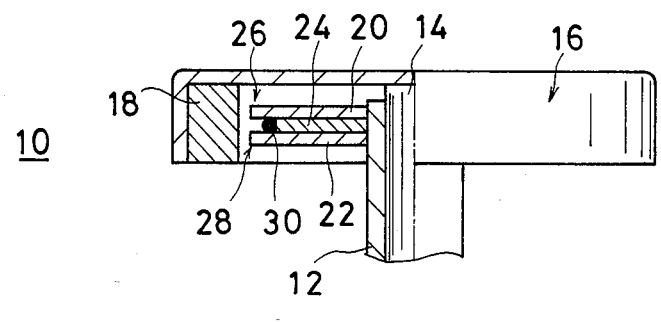
FIG. 9 is an illustrative sectional view showing another example of a frequency generator as a further another embodiment in accordance with the present invention.

FIG. 9 is an illustrative sectional view showing the other example of a frequency generator as another embodiment in accordance with the present invention. In the embodiment, the multipolar magnet 18 and the first and second salient-pole lines 26 and 28 facing thereto are modified as compared with the embodiment of FIG. 1.

Figure 10:
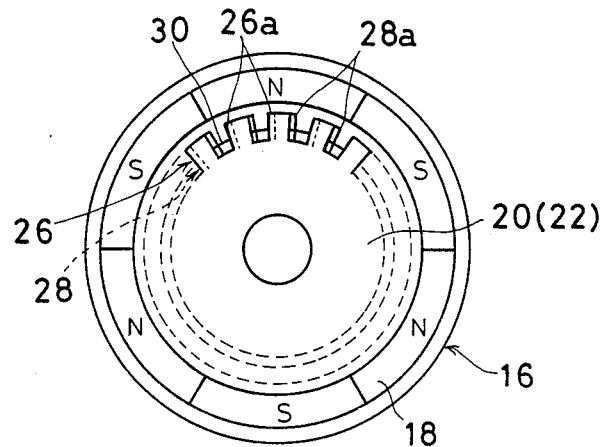
FIG. 10 is an illustrative plane view of the embodiment of FIG. 9.
Figure 11:
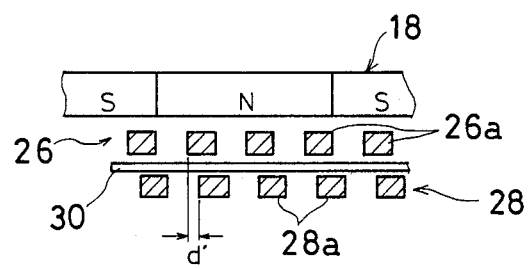
FIG. 11 is an illustrative developed view for explaining a relationship between a multipolar magnet and salient-pole lines of the embodiment of FIG. 9.

In more detail, the first and second salient poles 26a, 26a, ... and 28a, 28a, ... which are to be paired and included in the first and second salient-pole lines 26 and 28 are, as shown in FIGS. 10 and 11, arranged in divergence by the distance d' in the circumferential direction. While, the boundary line of the adjacent magnetizable sectors of the multipolar magnet 18 is formed as a straight line along the axial direction as shown in FIG. 11.

As described above, even when bringing the boundary line of the adjacent magnetizable sectors of the multipolar magnet 18 in parallel to the axial direction, and inclining the axial line of the first and second salient poles 26a and 28a to be paired and constituting the first and second salient-pole lines 26 and 28 against the axial direction, the alternating signal having the frequency corresponding to the rotation rate of the rotor 16 can be obtained in the generating coil 30 as same as the embodiment of FIG. 1 through FIG. 3. This is because that, as same as the previous embodiment, the magnetic flux from one magnetizable sector of the multipolar magnet 18 forms the loop returning to the adjacent magnetizable sector through the first and second salient poles 26a and 28a, and the magnetic flux interlinks with the generating coil 30.

Figure 12:
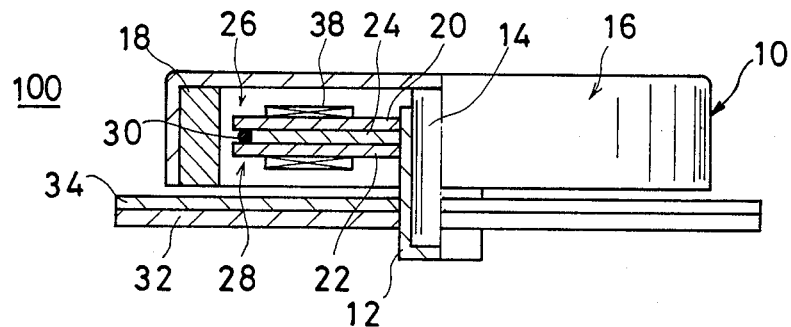
FIG. 12 is an illustrative sectional view showing the other example of a motor with frequency generator as another embodiment in accordance with the present invention.
Figure 13:
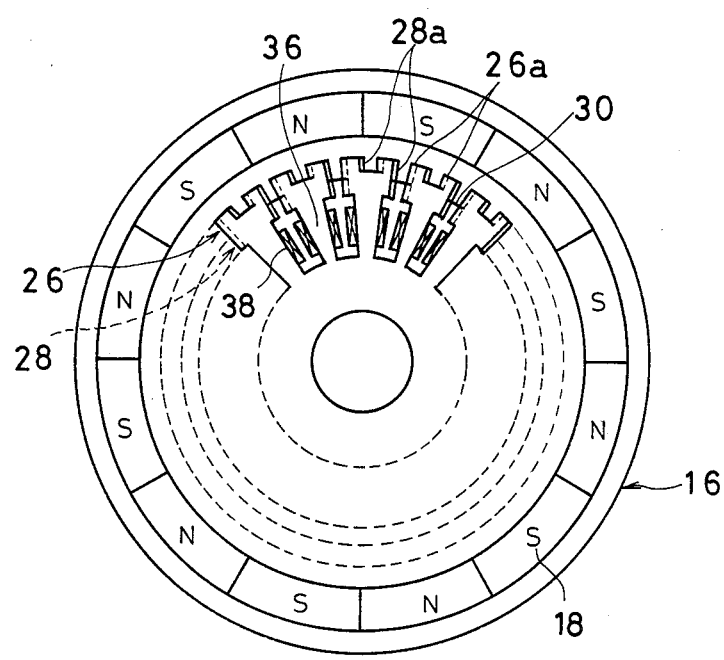
FIG. 13 is an illustrative plane view of the embodiment of FIG. 12.
Figure 14:
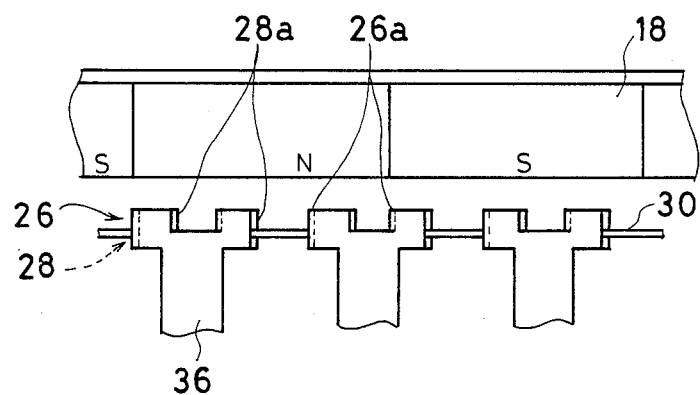
FIG. 14 is an illustrative developed view for explaining a relationship between a multipolar magnet and teeth of a stator and salient-pole lines of the embodiment of FIG. 12.

FIG. 12 is a sectional illustrative view showing the other example of a motor with frequency generator as another embodiment in accordance with the present invention. In the embodiment, as shown in FIGS. 13 and 14, the boundary line of the adjacent magnetizable sectors of the multipolar magnet 18 is formed as the straight line in parallel to the axial direction, and the salient-poles 26a and 28a to be paired of in the first and second salient-pole lines 26 and 28 are arranged in divergence in the circumferential direction, as same as FIGS. 10 and 11. The other configurations are as same as the motor 100 shown in FIG. 4 through FIG. 6.

Thus, by diversifying the salient poles 26a and 28a to be paired of the first and second salient-pole lines 26 and 28 in the circumferential direction, while bringing the boundary line of the adjacent magnetizable sectors of the multipolar magnet 18 in parallel to the axial direction, the multipolar magnet 18 may be manufactured simply.

Meanwhile, in the embodiments described above, the frequency generator or the motor of the outer rotor type having the first and second salient-pole lines arranged within the multipolar magnet are described in all cases. However, it is understood that the present invention may be applied similarly to the inner rotor type.

Although the present invention has been described and illustrative in detail, it is clearly understood that the same is by way of illustration and example only and is not to be taken by way of limitation, the spirit and scope of the present invention being limited only by the terms of the appended claims.

What is claimed is:

1. A frequency generator, comprising:

an annular multipolar magnet having a plurality of magnetizable sectors sectioned in a circumferential direction of said multipolar magnet, said plurality of magnetizable sectors being magnetized in an axial direction of said multipolar magnet and alternately in reverse polarity in the circumferential direction thereof, a first salient-pole line having a plurality of first salient poles distributed in the circumferential direction of said multipolar magnet, said plurality of first salient poles being opposed to said plurality of magnetizable sectors, a second salient-pole line being spaced from said first salient-pole line in the axial direction of said multipolar magnet and having a plurality of second salient poles distributed in the circumferential direction of said multipolar magnet, said plurality of second salient poles being opposed to said plurality of magnetizable sectors, said first and second salient poles corresponding to each other being overlapped in the axial direction of said multipolar magnet, the multipolar magnet being rotatable relative to the first and second salient poles, and a generating coil wound between said first and second salient-pole lines and in the circumferential direction of said multipolar magnet, wherein a boundary line defined by adjacent magnetizable sectors is intersected by an axial direction line defined by the overlapped first and second salient poles so that a respective one of the overlapped first and second salient poles is able to be simultaneously opposed to a magnetizable sector having a different polarity.

2. A frequency generator in accordance with claim 1, wherein the axial direction line defined by the overlapped first and second salient poles is in parallel with an axial line of said multipolar magnet, and the boundary line defined by adjacent magnetizable sectors is substantially inclined to the axial line of said multipolar magnet.

3. A frequency generator in accordance with claim 2, wherein the boundary line defined by adjacent magnetizable sectors includes a stepped portion being stepped in the circumferential direction of said multipolar magnet.

4. A frequency generator in accordance with claim 2, wherein the boundary line defined by adjacent magnetizable sectors is formed linearly and in inclination to the axial line of said multipolar magnet.

5. A frequency generator in accordance with claim 1, wherein said first and second salient-pole lines are formed so that a plurality of pairs of the overlapped first and second salient poles are opposed to a respective one of said magnetizable sectors of said multipolar magnet.

6. A frequency generator in accordance with claim 5, wherein (2n+1) pairs of the overlapped first and second salient poles are opposed to a respective one of said plurality of magnetizable sectors of said multipolar magnet.

7. A motor with a frequency generator, comprising:
a rotating shaft,
a multipolar magnet rotatably mounted on the rotating shaft and having a plurality of magnetizable sectors sectioned in a circumferential direction of said multipolar magnet, said plurality of magnetizable sectors being magnetized in an axial direction of said multipolar magnet and alternately in reverse polarity in the circumferential direction thereof,
a first salient-pole line having a plurality of first salient poles distributed in the circumferential direction of said multipolar magnet, said plurality of first salient poles being opposed to said plurality of magnetizable sectors, a second salient-pole line being spaced from said first salient-pole line in the axial direction of said multipolar magnet and having a plurality of second salient poles distributed in the circumferential direction of said multipolar magnet, said plurality of first salient poles being opposed to said plurality of magnetizable sectors, said first and second salient poles corresponding to each other being overlapped in the axial direction of said multipolar magnet, a driving coil wound in association with said first and second salient poles, and a generating coil wound between said first and second salient-pole lines and in the circumferential direction of said multipolar magnet, wherein a boundary line defined by adjacent magnetizable sectors is intersected by an axial direction line defined by the overlapped first and second salient poles so that a respective one of the overlapped first and second salient poles is able to be simultaneously opposed to a magnetizable sector having a different polarity.

8. A motor with a frequency generator in accordance with claim 7, wherein the axial direction line defined by the overlapped first and second salient poles is in parallel with an axial line of said multipolar magnet, and the boundary line defined by adjacent magnetizable sectors is substantially inclined to the axial line of said multipolar magnet.

9. A motor with a frequency generator in accordance with claim 8, wherein the boundary line defined by adjacent magnetizable sectors includes a stepped portion being stepped in the circumferential direction of said multipolar magnet.

10. A motor with a frequency generator in accordance with claim 8, wherein the boundary line defined by adjacent magnetizable sectors is formed linearly and in inclination to the axial line of said multipolar magnet.

11. A motor with a frequency generator in accordance with claim 10, wherein said first and second salient-pole lines are formed so that a plurality of pairs of the overlapped first and second salient poles are opposed to a respective one of said magnetizable sectors of said multipolar magnet.

12. A motor with a frequency generator in accordance with claim 11, wherein (2n+1) pairs of the overlapped first and second salient poles are opposed to a respective one of said plurality of magnetizable sectors of said multipolar magnet.

* * * * *